H. J. PODLEŠÁK.
GRAIN DIVIDER FOR HARVESTERS.
APPLICATION FILED APR. 8, 1911.
1,008,283.
Patented Nov. 7, 1911.
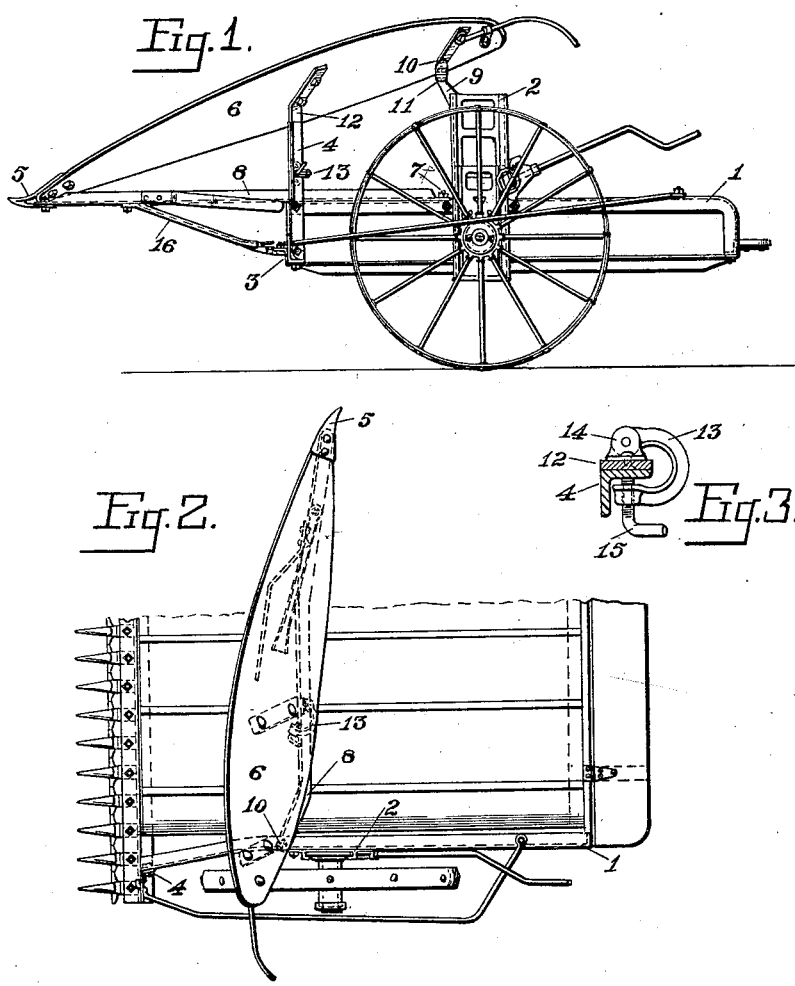

UNITED STATES PATENT OFFICE.

HENRY J. PODLEŠÁK, OF MOLINE, ILLINOIS, ASSIGNOR TO DEERE AND COMPANY, OF MOLINE, ILLINOIS, A CORPORATION OF ILLINOIS.

GRAIN-DIVIDER FOR HARVESTERS.

1,008,283.   Specification of Letters Patent.   Patented Nov. 7, 1911.

Application filed April 8, 1911. Serial No. 619,870.

*To all whom it may concern:*

Be it known that I, HENRY J. PODLEŠÁK, a citizen of the United States, residing at Moline, in the county of Rock Island and State of Illinois, have invented certain new and useful Improvements in Grain-Dividers for Harvesters, of which the following is a specification, reference being had therein to the accompanying drawing.

My invention relates to that type of outside dividers, which is readily removable from an operative to an inoperative position; and the object of my invention is to provide a divider which can be swung between the front and the rear of the platform, and out of the way, when the harvester is on a truck for transportation through a gateway or over narrow roads.

Referring to the accompanying drawings, Figure 1 is a side elevation of the grainward end of a harvester showing my divider in place. Fig. 2 is a plan of Fig. 1 showing the divider swung inward over the platform, and Fig. 3 is a detail.

1 is the grain-wheel end of a harvester-platform, to which is secured the grain-wheel guide 2.

3 is the finger-bar, and 4 is a post bolted or otherwise secured to the finger-bar and to the harvester-frame.

5 is the divider-point to which the forward end of the divider-board 6 is bolted.

Pivotally attached to the harvester-frame at 7 is a supporting bar 8 which extends forwardly and is firmly secured to the divider-point 5.

An arm 9, preferably integral with the grain-wheel guide, projects upward and forwardly from the latter. Secured to the divider-board 6 is a depending bracket 10, pivotally attached to the arm 9 at 11, the pivotal points 7 and 11 being in the same vertical plane. A depending arm 12 is secured to the divider-board 6 and engages with the post 4 when the divider is in an operative position; to firmly hold the divider in an operative position, I employ a locking mechanism consisting of a bifurcated and horizontally disposed member 13, one arm of which is pivotally secured to a casting 14 on the depending arm 12; the free arm of the member 13 is fitted with a threaded bolt 15 which engages with the post 4, to hold the depending arm 12 and the post 4 firmly together when the divider is swung into an operative position. By loosening the bolt 15 the bifurcated member 13 can be moved on its pivot and the divider swung over the platform and out of danger from possible injury during transportation of the harvester.

16 is a resilient fender and brace, its forward end pivotally secured to the bar 8, and its rearward end sprung into engagement with the outer guard-finger of the cutter-bar of the harvester; it is readily detachable from the guard-finger and does not interfere with the movement of the divider when the latter is moved to an inoperative or an operative position.

What I claim as my invention, and desire to secure by Letters Patent is,

1. In a harvester, the combination with a harvester-platform, of a grain-wheel guide secured thereto, an arm on said grain-wheel guide, a supporting-bar pivoted on the harvester-platform, a divider secured to the supporting-bar, and a bracket on the divider pivotally connected with the arm on the grain-wheel guide, said pivotal connection and the pivot of the supporting-bar being in the same vertical plane.

2. In a harvester, the combination with a harvester-platform, of a grain-wheel guide secured thereto, an arm on said grain-wheel guide, a supporting-bar pivoted on the harvester-platform, a divider secured to the supporting-bar, a bracket on the divider pivotally connected with the arm on the grain-wheel guide, said pivotal connection and the pivot of the supporting-bar being in the same vertical plane, and means on the platform and the divider to lock the latter in an operative position.

3. In a harvester, the combination with a harvester-platform, of a grain-wheel guide secured thereto, an arm on said grain-wheel guide, a supporting-bar pivoted on the harvester-platform, a divider secured to the supporting-bar, a bracket on the divider pivotally connected with the arm on the grain-wheel guide, said pivotal connection and the pivot of the supporting-bar being in the same vertical plane, an upwardly projecting arm on the platform, an arm on the divider to engage with the arm on the platform, and means to lock the two arms together to retain the divider in an operative position.

4. In a harvester, the combination with a harvester-platform, of a grain-wheel guide secured thereto, an arm on said grain-wheel guide, a supporting-bar pivoted on the harvester-platform, a divider secured to the supporting-bar, a bracket on the divider pivotally connected with the arm on the grain-wheel guide, said pivotal connection and the pivot of the supporting-bar being in the same vertical plane, an upwardly projecting arm on the platform, an arm on the divider to engage with the arm on the platform, and a lock on the divider-arm to hold the two arms together and the divider in an operative position.

5. In a harvester, the combination with a harvester-platform, of a grain-wheel guide secured thereto, an arm on said grain-wheel guide, a supporting-bar pivoted on the harvester-platform, a divider secured to the supporting-bar, a bracket on the divider pivotally connected with the arm on the grain-wheel guide, said pivotal connection and the pivot of the supporting-bar being in the same vertical plane, an upwardly projecting arm on the platform, and a dependent arm on the divider having a locking mechanism thereon adapted to embrace both arms and hold the divider in an operative position.

In testimony whereof I affix my signature, in presence of two witnesses.

HENRY J. PODLEŠÁK.

Witnesses:
H. E. RICH,
A. A. CONWELL.

Copies of this patent may be obtained for five cents each, by addressing the "Commissioner of Patents, Washington, D. C."